(12) United States Patent
Schiffmann

(10) Patent No.: US 6,322,832 B1
(45) Date of Patent: *Nov. 27, 2001

(54) MANUFACTURING METHOD AND APPARATUS UTILIZING REUSABLE DEFORMABLE SUPPORT

(75) Inventor: Robert F. Schiffmann, New York, NY (US)

(73) Assignee: Misonix Incorporated, Farmingdale, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/702,581

(22) Filed: Oct. 31, 2000

(51) Int. Cl.$^7$ ........................................................ A23L 3/00
(52) U.S. Cl. .................. 426/246; 426/238; 426/243; 426/513; 426/517; 99/451; 99/362
(58) Field of Search .............................. 426/277, 92, 238, 426/246, 243, 513, 517; 99/451, 362

(56) References Cited

U.S. PATENT DOCUMENTS

| | | | |
|---|---|---|---|
| 4,258,066 | * 3/1981 | Bernard | 426/231 |
| 4,448,793 | * 5/1984 | Akesson | 426/241 |
| 4,675,194 | 6/1987 | Gaffney . | |
| 5,115,732 | * 5/1992 | Mally | 99/483 |
| 5,141,762 | * 8/1992 | Mally | 426/412 |
| 5,362,509 | * 11/1994 | Martens | 426/524 |
| 5,871,783 | 2/1999 | Capodieci . | |
| 5,871,793 | 2/1999 | Capodieci . | |
| 5,914,140 | 6/1999 | Kamper et al. . | |
| 6,146,674 | * 11/2000 | Manna et al. | 42/238 |

FOREIGN PATENT DOCUMENTS

| | | |
|---|---|---|
| 200970 A | 6/1983 | (DE) . |
| 19849357A1 | 10/1998 | (DE) . |
| 198 49 357 A1 | 4/1999 | (DE) . |

* cited by examiner

*Primary Examiner*—Nina Bhat
(74) *Attorney, Agent, or Firm*—R. Neil Sudol; Henry D. Coleman; William J. Sapone

(57) ABSTRACT

In a method for the manufacture of frankfurters, hot dogs and other skinless sausage products, a meat emulsion is extruded onto a flexible conveyor belt which is then conveyed through an at least partially microwave-transparent tube whose internal diameter is equal to the desired diameter of the sausage product plus twice the thickness of the conveyor belt. In a camming type process, the conveyor belt is caused, upon its entry into the tube, to temporarily form a cylinder containing the meat emulsion. The temporary belt cylinder together with the surrounded meat emulsion extrudate is then conveyed through a microwave applicator to partially or thoroughly cook the meat emulsion. At the exit end of the tube, the conveyor belt naturally opens under internal stresses from its cylindrical shape to a flattened belt. The at least partially cooked sausage is then removed from the belt for further processing or packaging. The conveyor belt acts as a temporary skin to hold the meat emulsion during its microwave cooking.

37 Claims, 5 Drawing Sheets

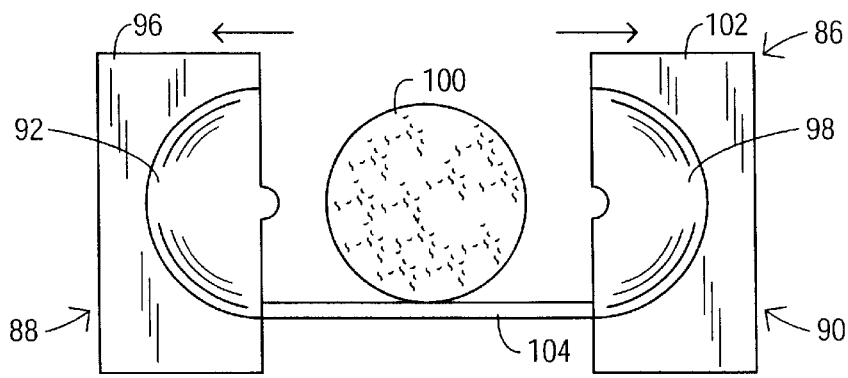
FIG. 14
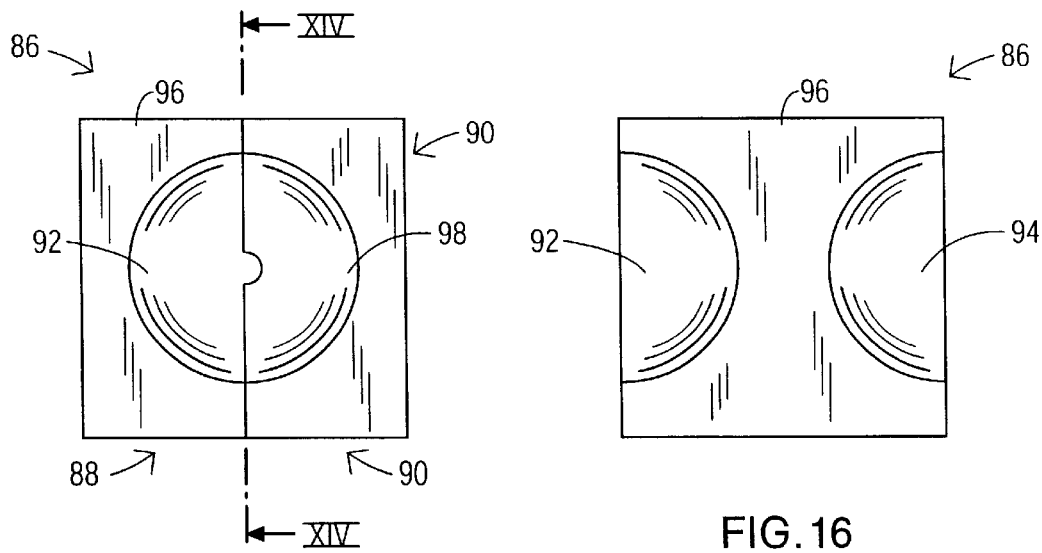
FIG. 15
FIG. 16
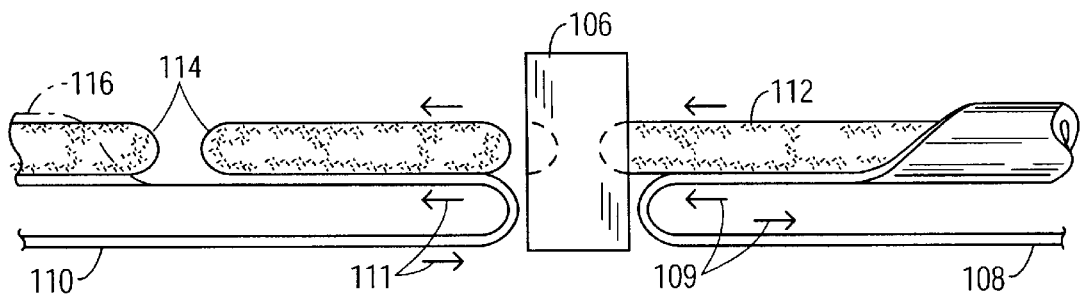
FIG. 17

MANUFACTURING METHOD AND APPARATUS UTILIZING REUSABLE DEFORMABLE SUPPORT

BACKGROUND OF THE INVENTION

This invention relates to a manufacturing process. The invention also relates to an associated apparatus. The process and apparatus may be used exemplarily in the manufacture of elongate, axially symmetric products. In the food industry, the method and apparatus are useful in the manufacture of meat products such as frankfurters, hot dogs, sausages or wursts or in the production of baked goods such as cakes and breadsticks. The process and method may also be used for forming elongate structural members such as solid or hollow rods or beams.

Frankfurters, hot dogs and other sausages are conventionally made by first comminuting meat along with spices, emulsifiers, flavors, preservatives and other additives to form an emulsion which may be a smooth flowable paste or may contain chunks of meat, cheese, vegetable matter or other ingredients. This emulsion is then stuffed into casings which may be edible or inedible. The encased emulsion is conveyed through a cooking system which ordinarily slowly raises the temperature of the emulsion, often in several steps, in order to cook the emulsion. The heating is usually done by hot air, both dry and moist, to a final temperature of approximately 162° F.

Most households in the U.S. today prefer frankfurters to be skinless, that is, without a casing which must be removed before frankfurter consumption. In the preparation of skinless sausages, the processor must remove the skin before final packaging in vacuum-sealed plastic bags. This process involves the physical stripping of the casing by hand or machine and discarding the used plastic wrap.

A significant problem with the conventional procedure is the cost and handling of the inedible casings. A manufacturer may pay several millions of dollars per stuffer line for the casings and then pay to dispose of them. This adds a significant cost to the manufacturing process. One facility has estimated a $5 million dollar per year revenue increase if this cost could be eliminated. And this estimate does not take the front office, purchasing and machinery capital costs into account.

Simply eliminating the casing step is not considered possible because the hot dog must be formed and held together before and during the cooking step. Otherwise, the emulsion will not hold its shape and the product will be ruined. Whatever method is devised must lend itself to high speed production techniques and not alter the taste and look of the product as well.

Although the concept of creating frankfurters or wursts without a casing has been well documented in prior art patents, most of these techniques have centered upon using standard heating platens or molds to create a skin on the product before final processing. These techniques have not been met with widespread acceptance since conductive or convective heat energy is expensive. When a platen is heated, much heat is lost to the surrounding environment or through conduction to the rest of the metallic apparatus. In addition, creating a skin by such methods is time consuming, thereby reducing the production throughput or requiring significant investment in capital equipment to keep output rates high.

OBJECTS OF THE INVENTION

A general object of the present invention is to provide a new manufacturing process.

A further, related object of the present invention is to provide a new process useful in the manufacture of elongate products having an axis of symmetry.

It is another object of this invention to provide a novel method of manufacturing at least a portion of a processed food product.

It is a more specific object of this invention to provide a novel method of producing skinless sausages without the need for inedible disposable casings, thereby significantly reducing the cost of manufacture.

It is a further object of this invention to provide an apparatus for producing skinless sausages without the need for inedible disposable casings, thereby significantly reducing the cost of manufacture.

These and other objects of the present invention will be apparent from the drawings and descriptions herein. It is to be noted that any one embodiment of the invention may meet one or more of the above-listed objects. No embodiment need meet every object of the invention.

SUMMARY OF THE INVENTION

The present invention is generally directed to a manufacturing method capable of producing a range of items made of a cured or hardened flowable material. The flowable material is held in a predetermined configuration by a deformable support member. The support member is at least partially transparent to energy which is applied externally to the deformed support member to at least partially harden or cure the flowable material so that it retains the predetermined configuration upon reconfiguring of the deformable support to release the hardened or cured material.

The present invention is particularly useful in the production of skinless sausages without the need for inedible disposable casings, thereby significantly reducing the cost of manufacture. This can increase the profits for the manufacturer and reduce the cost for the consumer.

The method of the invention, however, is also useful for manufacturing other kinds of foodstuffs such as cakes or breadsticks and for manufacturing non-comestibles such elongate structural members.

A manufacturing method comprises, in accordance with the present invention, placing a fluidic or flowable material on a support member and deforming the support member so that the support member at least partially surrounds the deposited material, to thereby hold the deposited material in a predetermined configuration. Energy is then applied to the deposited material through or via the deformed support member for a predetermined period. By virtue of the application of energy, the deposited material is hardened in the predetermined configuration. After the application of the energy to the deposited material, the support member is reformed to release the hardened material. The hardened material substantially retains the predetermined configuration.

It is contemplated that the support returns to a base or starting configuration after the energy application and material hardening process, thereby enabling use of the support in a subsequent operating cycle. The hardened material is removed from the support to enable placement of a new amount of fluidic or flowable material on the support.

In a preferred embodiment of the invention, the support member is a conveyor belt which is moved about an endless track or path to implement a continuous, as opposed to a batch type, food preparation process. The deforming of the support member includes deforming the conveyor belt during moving of the conveyor belt about the endless track or path. Preferably, the conveyor belt is curled about an axis extending parallel to the track or path of the belt.

It is contemplated that the conveyor belt is transported, with the fluidic material thereon, into a tubular member prior to the application of energy. Then the deforming of the conveyor belt takes place during the transporting of the conveyor belt into the tubular member. To facilitate the curling of the belt, an upstream or infeed side of the tubular member may be provided with an infeed structure for curling the belt in a camming type operation. The infeed structure has a cross-section which varies from planar or nearly planar at an input end to a cylindrical or nearly cylindrical configuration at an output end.

In carrying out the method of the present invention, the energy is applied through the tubular member and the curled conveyor belt. These components are therefore at least partially transparent or conductive of the energy used. Preferably, the energy is a waveform energy such as dielectric radiation. Dielectric radiation may be specifically microwave radiation or high-frequency radio-wave radiation. Where the flowable material is comestible, the energy applied serves to at least partially cook the material.

In accordance with another feature of the present invention, the fluidic material is placed on the conveyor belt by extruding the fluidic material onto the moving conveyor belt.

A manufacturing apparatus comprises, in accordance with the present invention, a resiliently deformable support member, a deformation structure engageable with the support member for deforming and holding the support member so that the support member at least partially surrounds a flowable material deposited on the support member, and an energy source disposed proximately to the deformed support member for applying energy to the foodstuff through the deformed support member.

Preferably, the deformable support member is a conveyor belt, while the deformation structure includes a tubular member, the conveyor belt being disposed to travel along a path extending through the tubular member. The energy source is disposed proximately to the tubular member so that the energy is transmitted through the tubular member and the deformed conveyor belt. Where the flowable material is a comestible composition or foodstuff, it is contemplated that the energy source is a microwave source and that an extruder deposits the comestible composition or foodstuff on the conveyor belt.

It is to be noted that different ancillary equipment may be included in a manufacturing apparatus in accordance with the present invention, depending on the particular application. For example, where the raw flowable material is a meat emulsion, various mechanical devices may be provided for shaping the flowable material at regularly spaced locations for purposes of forming rounded hot dog or sausage ends.

It is also possible, in accordance with the present invention, to prepare multiple-layered products. A molded and cured extrusion formed in a continuous manufacturing process has multiple coaxial layers usually of the same geometric layout, although the different layers may have cross-sections of different shapes.

BRIEF DESCRIPTION OF THE DRAWING

FIG. 14 is a schematic front elevational view of another cutter comprising opposed sliding blade elements, for forming rounded sausage ends in a manufacturing method pursuant to the present invention, showing the cutter in an opened or natural configuration.

FIG. 15 is a view similar to FIG. 14, showing the sliding-blade cutter element of FIG. 14 in a closed or operative configuration, at the end of a cutting stroke.

FIG. 16 is a side elevational view of a cutting blade element of the cutter of FIGS. 14 and 15.

FIG. 17 is a schematic side elevational view of a portion of a continuous-type manufacturing apparatus with deforming conveyor belts in accordance with the present invention, depicting installation of a cutter such as that shown in FIGS. 10–13 or 14–16.

DESCRIPTION OF THE PREFERRED EMBODIMENTS

Figure 1:
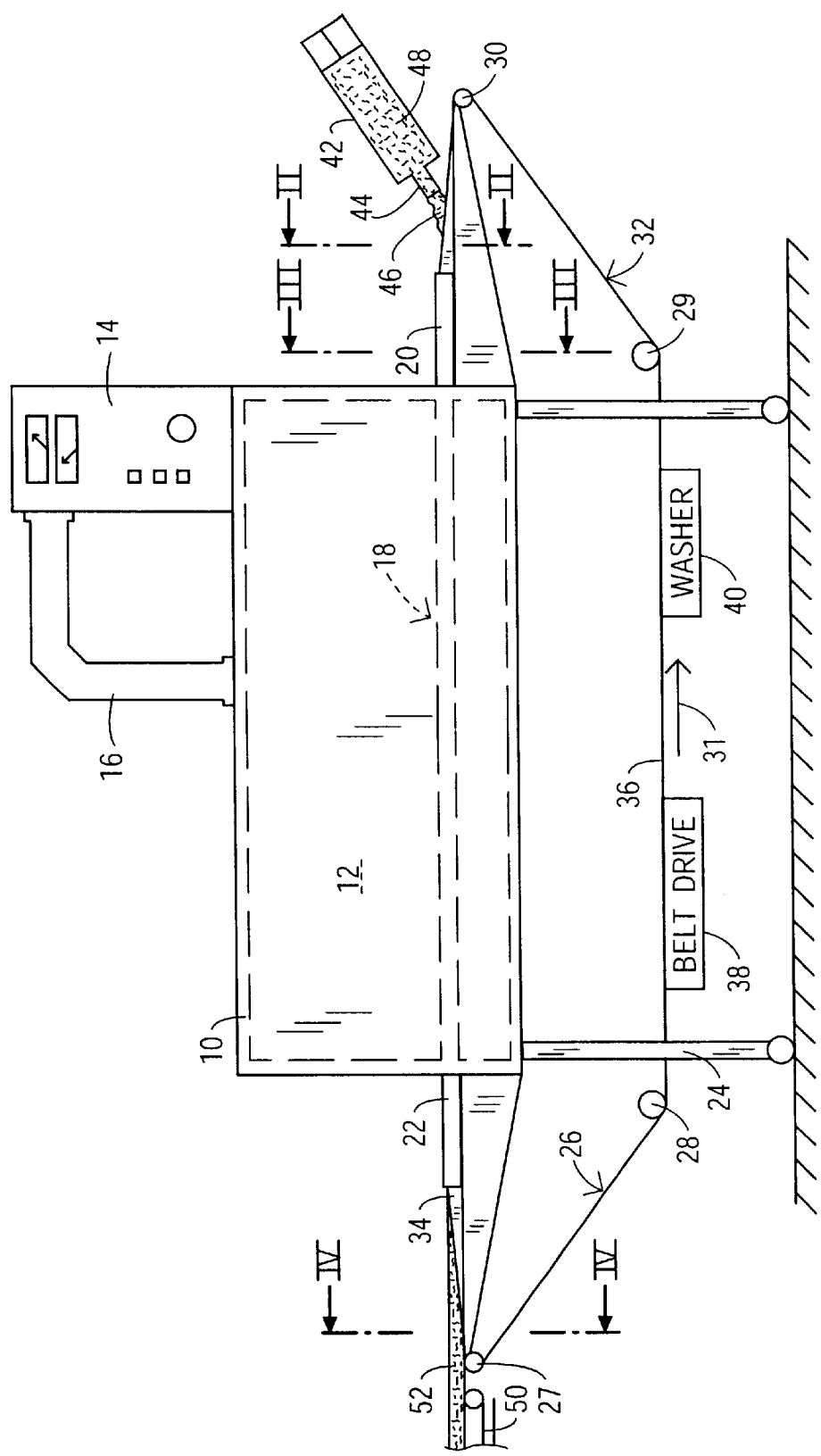
FIG. 1 is a schematic side elevational view of an apparatus for preparing skinless hot dogs and other kinds of skinless sausages, in accordance with the present invention.

As illustrated in FIG. 1, an apparatus for processing a food product such as a hot dog, frankfurter, wurst or other kind of sausage comprises a housing 10 defining a microwave cavity 12. Mounted to housing 10 is a microwave source or power supply 14. Source or power supply 14 communicates with cavity 12 via an interconnecting waveguide 16.

Extending through cavity 12, from one side of housing 10 to an opposite side thereof, is a rigid, at least partially microwave-transparent tubular member or guide tube 18 defining a foodstuffs travel path through the cavity. Tube 18 includes an infeed section 20 and an output section 22 both located externally to housing 10 on opposite sides thereof. Infeed section 20 and output section 22 perform a microwave choke function for at least substantially preventing the leakage of microwave radiation from cavity 12 into the external environs. In a non-illustrated modification of this structure, tube 18 protrudes from housing 10 on opposite sides thereof and is coaxially surrounded at opposite ends by infeed section 20 and output section 22, respectively. Infeed section 20 and outfeed section 22 are partially or completely made of steel or aluminum and have a diameter slightly larger than that of tube 18 but nevertheless small enough to prevent the leakage of microwave radiation.

Housing 10 is supported by a frame 24. A conveyor belt 26 is mounted to frame in part via rollers 27, 28, 29, 30. Conveyor belt 26 travels in a direction 31 along a loop-shaped endless path 32 including an upper segment 34 extending through tubular guide member 18 and a lower segment 36. Along lower path segment 36 is disposed a conveyor drive 38 which is in operative engagement with the belt for driving the belt along path 32. Also disposed along lower path segment 36 is a belt scraper and washer device 40.

Whereas tube 18 is made of a rigid material such as polypropylene, polytetrafluorethylene, glass or other materials suitable for food manufacture, belt 26 is made of a flexible material such as polytetrafluorethylene-coated fiberglass. Both materials are at least partially transparent to microwave radiation. The elasticity of belt 26 enables the belt to return to a pre-established configuration (e.g., planar) after release of an external deformation force.

An extruder 42 is disposed upstream of infeed section 20 of tube 20 so that a nozzle 44 of the extruder is well positioned for the placement of an extrudate 46 of a meat emulsion 48 (comminuted meat and other ingredients) onto belt 26. At a downstream end of upper belt path segment 34 is take-away conveyor 50 for removing cooked extrudate 52 from belt 26.

Meat emulsion 48 is prepared in the conventional manner of mixing various ingredients, chopping them to form a smooth paste of the desired consistency, with or without chunks of edible ingredients, and emulsifying the fats usually under a vacuum. The prepared emulsion 48 is deposited into extruder 42, which may also be placed under vacuum. Emulsion 48 is then extruded to form extrudate 46 onto conveyor belt 26. Nozzle 44 of extruder 42 preferably has a cylindrical shape and an internal diameter selected so that extrudate 46 has the desired final diameter for the sausage. Common sausage diameters for hot dogs and frankfurters are 18 to 28 mm, with diameters of 22 to 26 mm being most common.

Figure 2:
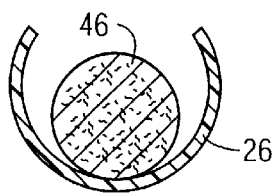
FIG. 2 is a schematic partial cross-sectional view taken along line II—II in FIG. 1.

At nozzle 44, conveyor belt 26 has a planar or a slightly cup-shaped configuration. As belt 26 enters infeed section 20 of tube 18 (see FIG. 2), the belt is forced to adopt a cylindrical shape which is curled or wrapped about a longitudinal axis of tube 18 and concomitantly about upper travel path 34. The internal diameter of tube 18 is equal to the desired diameter of the sausage plus twice the thickness of the conveyor belt 26. Belt 26 transports the meat emulsion extrudate 46 through tube 18, the main length of which is disposed in microwave cavity 12. That portion of tube 18 which resides in cavity 12 is made of a microwave transparent material such as polypropylene, polytetrafluorethylene, glass or other materials suitable for food manufacture, while sections 20 and 22 of tube 18 are made of metal or covered with a metal sheath, usually stainless steel or aluminum, to act as a microwave choke in order to prevent leakage of the microwave energy outside of cavity 12. As noted above, microwave chokes 20 and 22 may be separate tubular sections surrounding opposite ends of tube 18 which protrude from housing 10 on opposite sides thereof.

Figure 3:
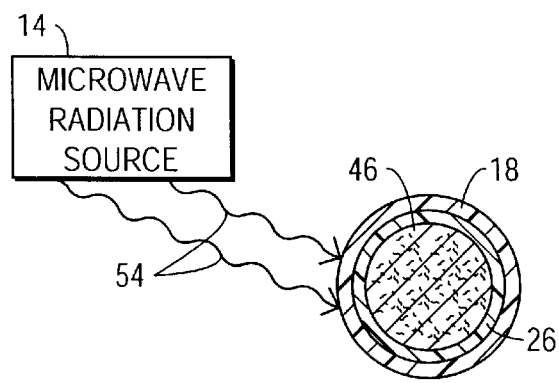
FIG. 3 is a schematic partial cross-sectional view taken along line III—III in FIG. 1.
Figure 4:
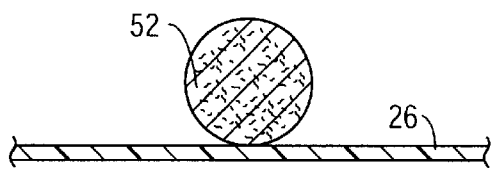
FIG. 4 is a schematic partial cross-sectional view taken along line IV—IV in FIG. 1.

As the emulsion extrudate 46 inside the conveyor belt cylinder (see FIG. 3), which is inside tube 18, passes through microwave cavity 12, the emulsion is exposed to microwave energy 54 (FIG. 3) generated by source or supply 14 and transmitted into cavity 12 via waveguide 16. The intensity of the applied microwave energy and the period of exposure of the emulsion to such energy are carefully selected in order to slowly cook (partially or wholly) the meat emulsion. It has been found, for example, that microwave exposure times of longer than one minute are preferable to shorter exposure times in order to reach the desired temperature of the meat emulsion at the end of the microwave period. Shorter exposure times are likely to produce temperature inconsistencies in the meat emulsion and may even create voids due to localized steam formation, and/or zones which are over-cooked or undercooked. It has been discovered that the preferred exposure times to microwave energy are in a range of 1 to 30 minutes.

Similarly, the selection of microwave power level is critical in order to achieve the best results. Too high a power level can produce the temperature nonuniformities, voids and over- or under-cooked zones noted above. It is also important that the microwave field be as uniform as possible, avoiding hot or cold spots. A well designed multi-mode applicator provides very good results in these circumstances.

The amount of microwave energy required will vary somewhat but will ordinarily be in the range of 0.1 to 10.0 watts per gram of meat emulsion and preferably in the range of 0.5 to 3.0 watts per gram of meat emulsion.

The frequency of the microwave energy used in various experiments was 2.45 GHz; however, it is likely that other microwave frequencies such as 0.915 GHz would be effective. It is possible that radio frequencies, such as the ISM frequencies of 14, 27 or 40 MHZ, may also be effective in cooking a meat emulsion product in the manner described herein.

In general, cooking is accomplished by the application of dielectric waveform energy in a frequency range between 1 MHz and 10 GHz. Microwave heating occurs in a frequency range of 100 MHZ to 10 GHZ, while high-frequency radiowave heating occurs in a frequency range of 1 MHz to 100 MHZ.

The microwave cooking process discussed herein may be used to partially or fully cook meat emulsion extrudate 46. In a partial cooking process, meat emulsion extrudate 46 conveyed by belt 26 through microwave cavity 12 is raised in temperature by the microwave energy 54 (FIG. 3) to 125–130° F., at which point the fluid paste-like emulsion becomes a firm gel. This gel is then conveyed as cylindrical extrudate 52 out of microwave housing 10 and transported to a subsequent cooking station by conveyor 50. The subsequent cooking process may be implemented by microwaves, hot air, steam, hot water, or other modality. By using microwave energy 54 to form a gel, a high yield is maintained, effectively binding the water.

In a complete cooking process, the meat emulsion extrudate 46 is completely cooked by microwave energy 54 in a single step with constant microwave power or, alternatively, in multiple steps using different levels of microwave power. In the former case, only a single microwave cavity 12 is required. In the latter case, either a single cavity containing different microwave zones, or multiple cavities each applying an appropriate amount of microwave energy, may be used. Where more than one microwave power generator are provided or where there are multiple cavities, multiple feeds or microwave guides are naturally required. The microwave extrusion and cooking process is further described in the following examples:

Example 1

Pork sausage—fully cooked. The following ingredients and method were used to prepare lean all-pork sausages.

A. Preparation of the meat emulsion:

|  | Grams |
| --- | --- |
| Pork (lean, trimmed) | 700 |
| Ex 32 (Protein Technologies) | 20 |
| Salt | 20 |
| Dextrose | 10 |
| Sodium tripolyphosphate | 5 |
| Water/ice | 245 |
| Sodium nitrate | 0.156 |
| Sodium erythorbate | 0.500 |

1. The Ex 32 was mixed with 100 grams of water (4° C.) in order to hydrate it.

2. The Ex 32 pre-blend, the pork, the sodium tripolyphosphate, the dextrose, the sodium nitrate and the sodium erythorbate were placed into a Cuisinart mixer or blender and mixed for five seconds.

3. 145 grams of ice was added to the mixture and blended therewith until the temperature of the final emulsion was 20° C. The final emulsion had a pink creamy appearance.

B. Extrusion:

1. The barrel of an electrically driven piston extruder 42 (FIG. 1) was filled with the meat emulsion 48 and packed as tightly as possible to avoid any voids.

2. The extruder 42 was mounted directly above the conveyor belt 26. The internal diameter of the nozzle 44 of the extruder 42 matched the internal diameter of the conveyor transport tube.

3. The speed of the production of extrudate 46 was adjusted to match the speed of the conveyor belt 26 as it moved through the microwave housing 10.

C. Microwave cooking process:

1. The speed of the conveyor belt 26 was adjusted to provide the desired time of cooking in the microwave cavity 12. In this case, that time was 3 minutes.

2. The extruder 42 and the conveyor drive 38 were turned on. As the conveyor belt 26 entered the transport tube 18 and choke 20 external to the microwave housing 10, the belt curled into a cylinder within the tube. The meat emulsion extrudate 46 was thereby transported into the microwave cavity 12.

3. Just prior to the meat emulsion extrudate 46 entering the microwave cavity 12, the microwave power was energized to 100 watts and slowly ramped up as the meat moved through the cavity. By the time the meat had filled the tube inside the microwave applicator, the microwave power was fully energized, in this case to 250 watts.

4. As the cooked pork sausage exited the microwave cavity 12 at 71° C. (160° F.), it was sliced into desired lengths, for example, 6 inches. These segments were then quickly cooked, packaged and frozen.

Example 2

Beef sausage—partially cooked. The following ingredients and method were used to prepare lean all-beef sausages.

A. Preparation of the meat emulsion:

|  | Grams |
| --- | --- |
| Beef (grounds, 73% lean) | 700 |
| Ex 32 (Protein Technologies) | 20 |
| Salt | 20 |
| Dextrose | 10 |
| Sodium tripolyphosphate | 5 |
| Water/ice | 245 |
| Sodium nitrate | 0.156 |
| Sodium erythorbate | 0.500 |

1. The Ex 32 was mixed with 100 grams of water (4° C.) in order to hydrate it.

2. The Ex 32 pre-blend, the beef, the sodium tripolyphosphate, the dextrose, the sodium nitrate and the sodium erythorbate were placed into a Cuisinart mixer or blender and mixed for five seconds.

3. 145 grams of ice was added to the mixture and blended therewith until the temperature of the final emulsion was 25° C. The final emulsion had a reddish creamy appearance.

B. Extrusion:

1. The barrel of an electrically driven piston extruder 42 (FIG. 1) was filled with the meat emulsion 48 and packed as tightly as possible to avoid any voids.

2. The extruder 42 was mounted directly above the conveyor belt 26. The internal diameter of the nozzle 44 of the extruder 42 matched the internal diameter of the conveyor transport tube.

3. The speed of the production of extrudate 46 was adjusted to match the speed of the conveyor belt 26 as it moved through the microwave housing 10.

C. Microwave cooking process:

1. The speed of the conveyor belt 26 was adjusted to provide the desired time of cooking in the microwave cavity 12. In this case, that time was 2 ½ minutes.

2. The extruder 42 and the conveyor drive 38 were turned on. As the conveyor belt 26 entered the transport tube 18 and choke 20 external to the microwave housing 10, the belt curled into a cylinder within the tube. The meat emulsion extrudate 46 was thereby transported into the microwave cavity 12.

3. Just prior to the entry of the meat emulsion extrudate 46 into the microwave cavity 12, the microwave power was energized to 100 watts and slowly ramped up as the meat moved through the cavity. By the time the meat had filled the tube inside the microwave applicator, the microwave power was fully energized, in this case to 125 watts.

4. The cooked beef sausage exited the microwave cavity 12 at 52–54° C. (125–130° F.). It was a firm gel at this point. This gel extrudate 52 was cut into 6" sausage lengths.

5. The cut sausage lengths were placed on trays and into a microwave oven where they were finish-cooked by exposure to microwave energy for two minutes.

It is to be noted that instead of cutting the gelled sausage and microwaving on trays, the uncut gel could have been transported through on conveyor 50, as a single continuous length, through a second microwave applicator. It is to be further noted that the fat content of the sausage can be adjusted by adding pork, beef or other fats, or combinations thereof, to the meat blend described in step 2 above, after first pre-blending the meat with ice to 6–8° C. (35–39° F.).

The mixing/chopping/blending operation is preferably performed under vacuum, as is the extrusion. This procedure is followed to eliminate voids in the emulsion 48 and extrudate 46 which can result in voids in the surface and interior of the finished sausage.

Other variants too the above-described procedure include the addition of other ingredients such as spices, liquid smoke and particulates and the extrusion or cutting of the sausage emulsion 46 to the desired length prior to its entering the microwave cavity 12.

The process described above may also be used to form skinned sausage products. For example, the foodstuff placed on conveyor belt 26 may be meat emulsion which has been stuffed into an edible casing. The stuffed casing may be formed into attached or separated links which are deposited onto conveyor belt 26. The belt may be deformed as described above during the cooking process. Additional cooking may be effectuated downstream of microwave cavity 12.

In an alternative process, extruder 42 is a special commonly available extruder which, together with a first meat emulsion as described hereinabove, extrudes a second emulsion surrounding the first emulsion. The second emulsion is formulated to form a skin as a result of the cooking process described above, where the skin is texturally different from the main body of the sausage product. Accordingly, the second emulsion may be made of meat, vegetable, or other protein materials, gums, or modified starches.

In another alternative process for forming skinned sausage products, the energy applied to the surface layers of a homogenous meat emulsion is greater than the energy applied to the inner portion of the emulsion. This differential cooking may be implemented exemplarily by applying heat energy to the surface layers of the meat emulsion. The heat energy may be generated in the conveyor belt 26 and/or guide tube 18 where one or both of these components are made of a glass, plastic or other material that is only partially transparent to the microwave or dielectric energy. A portion of that energy (e.g., 5% to 25%) is absorbed by conveyor belt 26 and/or tube 18 and results in an elevated temperature at the outer surface of the meat emulsion, thereby aiding in or causing the formation of a skin. An example of an appropriate material is a thermoset polyester matrix in which is embedded a controlled amount of an absorbent metal-containing powder or other mineral.

In yet another alternative process for forming skinned sausage products, housing 10 is provided with conventional heating coils (not shown) for generating an elevated oven temperature in cavity 12. Thus, guide tube 18 will be heated to the elevated temperature and will operate in part to transfer heat over belt 26 to the outer layers of the meat emulsion.

Figure 5:
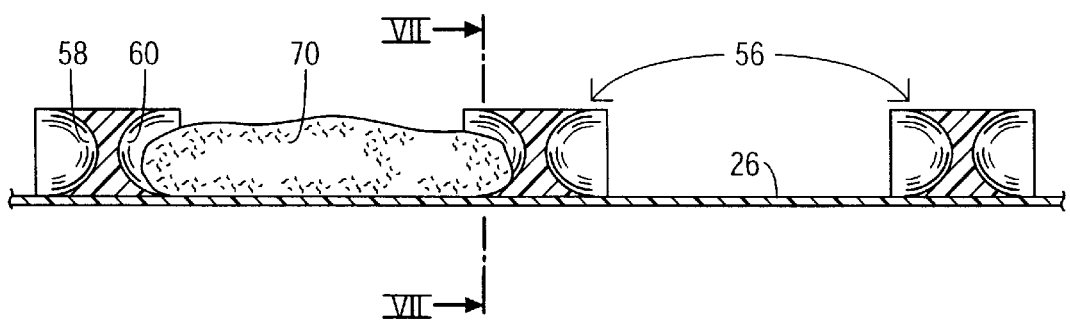
FIG. 5 is a schematic longitudinal cross-sectional view of a conveyor belt of the apparatus of FIG. 1, showing a modification of the belt for purposes of forming hot dogs and other kinds of sausages having rounded or substantially hemispherical ends, and further showing a measured amount of meat emulsion deposited on the belt prior to a partial cooking process.
Figure 6:
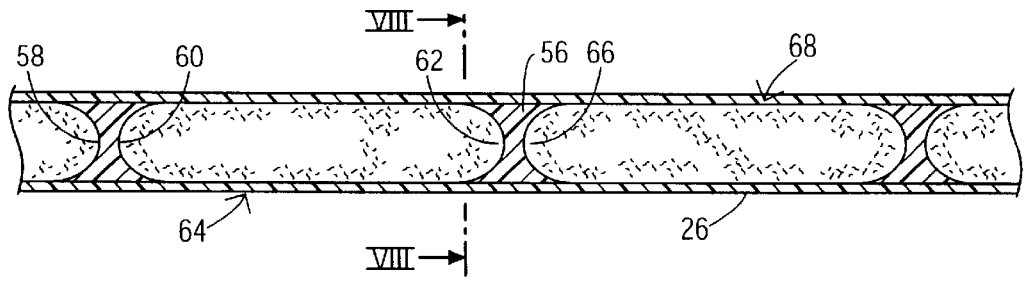
FIG. 6 is a view similar to FIG. 5, showing the belt of that drawing figure with partially cooked expanded meat emulsion, with the conveyor belt deformed in a curled configuration about the meat emulsion.
Figure 7:
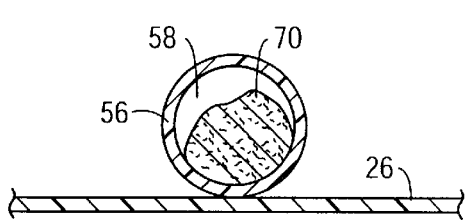
FIG. 7 is a transverse cross-sectional view taken along line VII—VII in FIG. 5.
Figure 8:
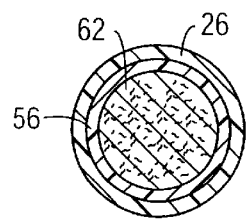
FIG. 8 is a a transverse cross-sectional view taken along line VIII—VIII in FIG. 6.

As illustrated in FIGS. 5–8, conveyor belt 26 may be provided with a plurality of end-forming blocks or shaping elements 56 attached to an upper surface of the belt at equispaced positions therealong. Each block 56 has a pair of oppositely facing, generally hemispherical concave surfaces 58 and 60 for providing a trailing end 62 (FIG. 6) of a first sausage 64 and a leading end 66 of a second sausage 68 with generally hemispherical shapes. FIGS. 5 and 7 show a predetermined or measured quantity 70 of meat emulsion deposited between two adjacent or successive blocks 56 on belt 26. As depicted in FIGS. 6 and 8, this deposited amount of the fluidic comminuted or particulate meat material is redistributed to fill the entire space between the two adjacent or successive blocks 56 by the closing of the conveyor belt 26 about the blocks 56 and the deposited meat emulsion. Each quantity 70 of deposited meat emulsion are sufficient in volume so that, when belt 26 is deformed into a cylindrical shape containing the meat emulsion, the deposited emulsion quantity 70 entirely fills the space between blocks 56 and particularly between surfaces or concavities 58 and 60 of adjacent blocks 56 to form rounded ends on the measured quantity 70 of emulsion.

Figure 9:
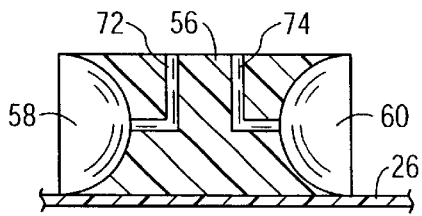
FIG. 9 is a partial longitudinal cross-sectional view of the conveyor belt of FIGS. 5 and 6, showing a modification thereof.
Figure 10:
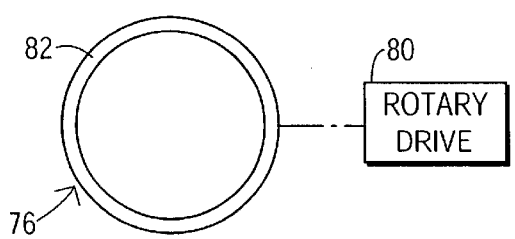
FIGS. 10–13 are schematic front elevational views of an iris-type cutter element for forming rounded sausage ends in a manufacturing method pursuant to the present invention, showing successive stages in a closure operation of the cutter element.
Figure 11:
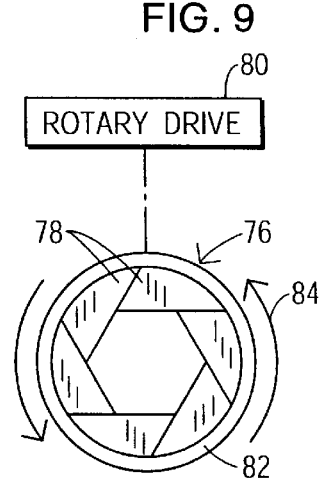
Figure 12:
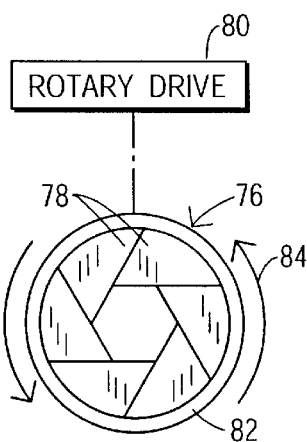
Figure 13:
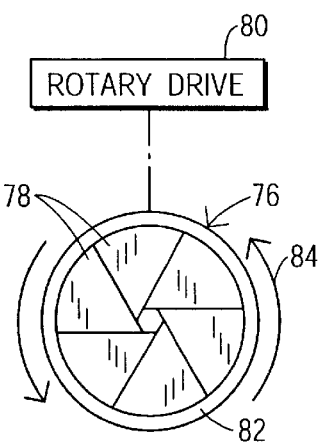

Blocks 56 may be made of rigid or deformable or elastic material. Of course, the material used must be food-contact approved under government regulations. Silicone, polypropylene and tetrafluoroethylene are such approved materials. As depicted in FIG. 9, a block 56 may be provided with ducts or vents 72 and 74 for bleeding air away from surfaces 58 and 60 during the expansion of the fluidic comminuted or particulate meat material.

FIGS. 10–13 depict successive stages in the operation of an iris-type cutter 76 to form hemispherical ends on successive sausages during a manufacturing operation utilizing belt 26 and microwave cavity 12, as described above with reference to FIG. 1. Cutter 76 comprises a plurality of overlapping, arcuate blade elements 78 linked to a rotary drive 80 via a transmission chain including a planetary gear 82. Upon actuation of drive 80 and a consequent rotation of gear 82 in a direction indicated by arrows 84, blade elements 78 shift inwardly, overlapping to an increasing diminished extent, so as to form a hemispherical surface.

In an alternative design, shown in FIGS. 14–16, for forming sausage ends in the deforming-belt manufacturing process described above, a cutter 86 comprises a pair of opposed sliding elements 88 and 90. Cutter element 88 includes a pair of oppositely facing quarter-spherical blades 92 and 94 mounted to a blade holder 96. Similarly, cutter element 90 includes a pair of oppositely facing quarter-spherical blades 98 (only one shown) mounted to a blade holder 102. Cutter elements 88 and 90 reciprocate in synchronism, but in opposite directions, so as to periodically close on an extruded fluidic material 100 deposited on a conveyor belt 104.

FIG. 17 is a schematic side elevational view of a portion of a continuous-type manufacturing apparatus as described above, depicting installation of an end-forming device 106 between a pair of cascaded or tandem deformable conveyor belts 108 and 110. End-forming device 106 may take the form of cutter 76 or 86 described above with reference to FIGS. 10–13 and 14–16, respectively. Belts 108 and 110 are respectively disposed on an upstream side and a downstream side of device 106 and move in directions indicated by arrows 109 and 111, respectively. Belt 108 shapes or molds an elongate continuous and uninterrupted length 112 of a meat emulsion or other flowable material which is hardenable into a desired shape by the application of microwave radiation. End-forming device 106 operates at periodic intervals to separate meat emulsion length 112 into a series of shorter length segments1 14. It is contemplated that end-forming device 106 and belt 110 are disposed upstream of microwave housing 10 (FIG. 1). Thus, downstream conveyor belt 110 is curled, as indicated at 116, to surround segments 114 for conveyance to a microwave cavity 12 (FIG. 1).

In a possible alternative design, end formation is effectuated downstream of microwave cavity 12. In that case, downstream conveyor belt 110 may be curled, as indicated at 116, to surround segments 114 for conveyance, for example, to another microwave treatment chamber or other processing station. Scrap pieces (not shown) or material generated by the operation of end-forming device 106 may be recycled back for inclusion in the meat emulsion deposited on belt 108 upstream of housing 10.

Figure 18:
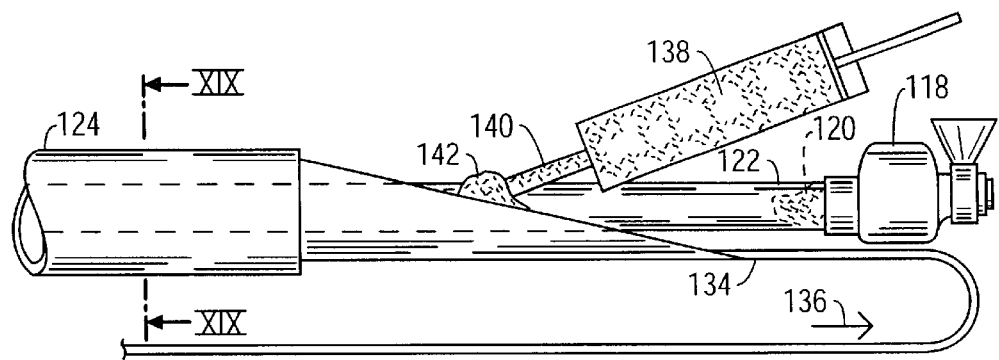
FIG. 18 is a schematic partial side elevational view of an assembly in accordance with the present invention for forming a multiply layered product in a continuous process.
Figure 19:
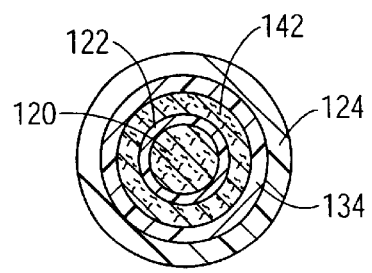
FIG. 19 is a schematic partial cross-sectional view taken along line XIX—XIX in FIG. 18.

In a modified apparatus depicted in FIGS. 18 and 19 for producing a multiply layered product, an extruder or pump 118 is disposed at an upstream end of a tube 122 for injecting a filling material 120 into the tube. Tube 122 extends at least part way into a second, larger rigid tubular member 124 made of a material which is at least partially transparent to microwave radiation. A deformable conveyor belt 134 moves in a loop along a travel direction 136 towards an upstream end of tube 124. Another extruder 138 is provided so that a nozzle 140 thereof is disposed between the upstream ends of tube 122 and 124 for the deposition of an extrudate 142 of a flowable microwave material onto belt 124. Belt 124 is deformed by the leading end of tube 124 into a cylindrical configuration surrounding the deposited extrudate 142 which in turn flows to surround tube 122.

Outer tube 124 extends into microwave cavity 12 (FIG. 1) for purposes of maintaining the shape of extrudate 142 inside cavity 12 during a microwave irradiation process. Filling material 120 is ejected from a downstream end of inner tube 122 into the extrudate 142 held by deformed belt 134. Inner tube 122 may extend at least partially into the microwave cavity 12 for enabling a hardening or curing of extrudate 142 prior to the deposition of filling material 120 therein at the downstream end of tube 122.

Outer tube 124 and belt 134 are made of materials which are at least partially transparent to microwave radiation. Where extrudate 142 is a comestible material or foodstuff, the transparency of outer tube 124 and outer belt 134 enable an at least partial cooking of the extrudate 142 by the microwave radiation. Inner tube 122 may also be made of microwave transparent material so that filling material 120 is exposed to and absorbs microwave radiation in cavity 12.

Where the inner tube 122 is microwave transparent, the shell material could be a yellow cake batter, while the filling could be a chocolate batter, thereby producing a two-toned cake. Where the inner tube 122 is microwave reflective (e.g., stainless steel), the filling material will remain unaffected by the microwave field in cavity 12. An example of a product produced by the technique would be a jelly-filled cake stick where the shell is made of yellow cake batter and the filling is fluid jelly.

In an alternative assembly, filling material 122 and extrudate 142 may be deposited simultaneously via a co-extruder (not shown). In some such cases, inner tube 122 may be omitted, for example, in the manufacture of cheese-filled frankfurters, cheese-filled bread sticks, or jelly-filled snack cakes. It is possible to modify the formulas of the filling and/or shell to provide different cooked properties.

Although the invention has been described in terms of particular embodiments and applications, one of ordinary skill in the art, in light of this teaching, can generate additional embodiments and modifications without departing from the spirit of or exceeding the scope of the claimed invention.

For example, it is possible to utilize a deformable support for maintaining the shape of a food product during a batch type cooking process. It that case, for example, instead of a conveyor belt, the support takes the form of a resilient plate or dish which is periodically deformed by actuators. The actuators may be driven mechanically, hydraulically, electromagnetically, etc. A reciprocating or rotating arm is utilizable to push the cooked or partially cooked foodstuff from the support upon an opening thereof after a cooking operation.

It is to be understood that the method and apparatus described herein may be used to harden or cure shaped flowable materials other than meat emulsions. For instance, other types of flowable comestible materials such as vegetarian or meat substitute emulsions, cake batter and fillings, liquid egg whites or egg yolks, or bread stick dough, may be placed on a deformable support and subjected to a curing energy through the deformed support. Where the flowable material is very liquid, conveyor belt 26 may be provided with dams (not shown) attached, like blocks 56 (FIGS. 5 and 6), to belt 26 at a plurality of spaced locations for limiting the longitudinal flow of the microwavable material. Alternatively, the dams may be inserted onto the belt upstream of the cooking chamber and removed from the belt downstream thereof. After at least partial cooking and hardening of the flowable material inside the deformed conveyor belt 26 and after the reforming of the belt to release the hardened foodstuff, the foodstuff may be cut to form packagable slices, cakes or segments. The dams are made of a microwave transparent food-contact-safe material such as polyethylene, polytetrafluoroethylene, or silicone.

Alternatively, the disclosed process and apparatus may be used in the manufacture of products from flowable materials other than foodstuffs, for example, hardened resin chips suspended in a polymeric matrix, wood or ceramic particles in an adhesive or binder matrix, etc. Possible products include dowels and structural members. Where the structural members are of a small diameter, say, 2 to 3 inches, the microwave energy has a frequency in a range around 2450 MHZ. Where the structural members are of a larger diameter, say, 6 inches, the microwave energy has a frequency in a range around 915 MHZ. Even lower frequencies may be used for larger cross-sections.

It is to be additionally understood that even in a continuous process as described herein, products of different shapes, particularly various cross-sectional shapes, may be manufactured. The cross-sectional shape of the product is largely controlled, in the continuous process, by the cross-section of the tube (e.g., tube 18) which surrounds the deformable belt 26 in the microwave cavity 12. That cross-section can be, for instance, polygonal or oval.

In one modification of the apparatus disclosed herein, a plurality of microwave radiation chambers are disposed in sequence along a travel path of a deformable conveyor belt. Each successive chamber (not shown) is heated to a higher temperature than the preceding chamber. The chambers are heated to minimize the cooling of the outer layers of the material being treated by microwave radiation. Heating of the flowable material may be accomplished in a single microwave cavity 12 by slowly ramping the temperature in the cavity to conform with the internal temperature of the flowable material in the cavity.

Belt 26, 110, or 134 may contain a microwave absorbent substance such as ferrite. In that case, the absorption of microwave energy by the ferrite may be sufficient to heat the flowable material by convection so as to cause the formation of a skin or a browned and crisp outer layer.

In the embodiment of FIG. 17, the function of end-forming device 106 may be performed by two separate cutting devices, one for forming the leading end and the other for forming the trailing end of a sausage link. In this case, a third conveyor is used to transport the partially cut sausage blank from one cutting device to the other.

Accordingly, it is to be understood that the drawings and descriptions herein are proffered by way of example to facilitate comprehension of the invention and should not be construed to limit the scope thereof.

What is claimed is:

1. A manufacturing method comprising:

providing a flowable material;

depositing said flowable material on a deformable support member;

deforming said support member so that said support member at least partially surrounds the deposited material, to thereby hold the deposited material in a predetermined configuration;

applying energy to the deposited material through the deformed support member for a predetermined period;

by virtue of the application of said energy, hardening the deposited material in said predetermined configuration; and after the application of said energy, reforming said support member to release the hardened material.

2. The method defined in claim 1 wherein said support member is a conveyor belt, further comprising moving said conveyor belt about an endless track or path, the deforming of said support member including deforming said conveyor belt during moving of said conveyor belt about said endless track or path.

3. The method defined in claim 2 wherein the deforming of said conveyor belt includes curling said conveyor belt about an axis extending parallel to said track or path.

4. The method defined in claim 3 wherein moving of said conveyor belt includes transporting said conveyor belt with the deposited material thereon into a tubular member, the deforming of said conveyor belt taking place during the transporting of said conveyor belt into said tubular member.

5. The method defined in claim 4 wherein the applying of said energy includes applying said energy through said tubular member and the curled conveyor belt.

6. The method defined in claim 5 wherein said energy is a waveform energy, said tubular member and said conveyor belt being at least partially transparent or impervious to said energy.

7. The method defined in claim 6 wherein said energy is dielectric radiation.

8. The method defined in claim 7 wherein said dielectric radiation is taken from the group consisting of microwave radiation and high-frequency radio-wave radiation.

9. The method defined in claim 7 wherein the placing of said flowable material on said conveyor belt includes extruding said flowable material onto the moving conveyor belt.

10. The method defined in claim 1 wherein the applying of said energy includes applying said energy through the deformed support member.

11. The method defined in claim 10 wherein said energy is a waveform energy, said support member being at least partially transparent or impervious to said energy.

12. The method defined in claim 11 wherein said energy is a dielectric radiation.

13. The method defined in claim 12 wherein said dielectric radiation is taken from the group consisting of microwave radiation and high-frequency radio-wave radiation.

14. The method defined in claim 13 wherein said dielectric radiation is microwave radiation and said flowable material is a comestible composition or foodstuff, said microwave radiation being applied to said foodstuff for a duration of 1 to 30 minutes.

15. The method defined in claim 14 wherein said comestible composition or foodstuff is a meat emulsion product.

16. The method defined in claim 15 wherein said microwave radiation has an intensity or power level in a range of 0.1 to 10.0 watts per gram of said meat emulsion product.

17. The method defined in claim 16 wherein said microwave radiation has an intensity or power level in a range of 0.5 to 3 watts per gram of said meat emulsion product.

18. The method defined in claim 14 wherein the hardening of the deposited material includes at least partially cooking said comestible composition or food product.

19. The method defined in claim 1 wherein said energy is microwave radiation and said flowable material is a comestible composition or foodstuff, said microwave radiation being applied to said foodstuff for a period of time effective to at least partially cook said comestible composition or foodstuff.

20. The method defined in claim 19, further comprising removing the at least partially cooked comestible composition or foodstuff from the support in anticipation of or in preparation for a subsequent cooking cycle.

21. The method defined in claim 1 wherein said flowable material is a first flowable material, further comprising placing a second flowable material on said support member so that said second flowable material is disposed inside said first flowable material.

22. The method defined in claim 21 wherein the depositing of said second flowable material on said support member includes pumping or extruding said flowable material through a tube extending into the deformed support member.

23. The method defined in claim 1 wherein the deforming of said support surface includes curling said support surface about an axis.

24. The method defined in claim 1 wherein deforming of said support member includes moving said support member together with the deposited flowable material into a substantially rigid deformation member.

25. The method defined in claim 1 wherein the depositing of said flowable material on said support member includes extruding said flowable material onto said support member.

26. A manufacturing apparatus comprising:
a resiliently deformable support member;
deformation means engageable with said support member for deforming and holding said support member so that said support member at least partially surrounds a fluidic or flowable material; and
an energy source disposed proximately to the deformed support member for applying energy to said fluidic or flowable material through the deformed support member.

27. The apparatus defined in claim 26 wherein said deformable support member is a conveyor belt.

28. The apparatus defined in claim 27 wherein said deformation means includes a tubular member, said conveyor belt being disposed to travel along a path extending through said tubular member.

29. The apparatus defined in claim 28 wherein said energy source is disposed proximately to said tubular member.

30. The apparatus defined in claim 29 wherein said energy source is a source of dielectric radiation.

31. The apparatus defined in claim 29 wherein at least one of said tubular member and said conveyor belt is only partially transparent to said cooking energy, to produce a temperature elevation of said conveyor belt.

32. The apparatus defined in claim 28 wherein said tubular member is an outer tubular member, further comprising a inner tubular member extending into said outer tubular member for directing a filling material into said fluidic or flowable material.

33. The apparatus defined in claim 26, further comprising a plurality of separators disposed at spaced location along said belt.

34. The apparatus defined in claim 33, wherein said separators are blocks provided with concave surfaces for forming rounded ends on a formed product.

35. The apparatus defined in claim 26, further comprising deposition means disposed proximately to said support member for placing a cookable foodstuff on said support member.

36. The apparatus defined in claim 35 wherein said deposition means includes an extruder.

37. The apparatus defined in claim 26, further comprising cutters for forming a rounded end on a product made by said apparatus.

* * * * *